United States Patent
Hall

(10) Patent No.: US 11,922,576 B2
(45) Date of Patent: Mar. 5, 2024

(54) SYSTEM AND METHOD FOR MAPPING THE SKIN

(71) Applicant: Triangulate Labs, Inc., Boynton Beach, FL (US)

(72) Inventor: William D. Hall, Boynton Beach, FL (US)

(73) Assignee: Triangulate Labs, Inc., Boynton Beach, FL (US)

( * ) Notice: Subject to any disclaimer, the term of this patent is extended or adjusted under 35 U.S.C. 154(b) by 0 days.

(21) Appl. No.: 17/568,431

(22) Filed: Jan. 4, 2022

(65) Prior Publication Data
US 2023/0215096 A1    Jul. 6, 2023

(51) Int. Cl.
*G06T 17/20*  (2006.01)
*G06T 7/246*  (2017.01)
*G06T 7/70*   (2017.01)

(52) U.S. Cl.
CPC .............. *G06T 17/20* (2013.01); *G06T 7/251* (2017.01); *G06T 7/70* (2017.01); *G06T 2207/30088* (2013.01); *G06T 2207/30196* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 8,761,439 B1 * | 6/2014 | Kumar | G06T 7/73 382/103 |
| 10,529,137 B1 * | 1/2020 | Black | G06T 15/04 |
| 2017/0046868 A1 * | 2/2017 | Chernov | G06T 7/246 |
| 2020/0162703 A1 * | 5/2020 | Meier | G06T 17/10 |
| 2021/0012549 A1 | 1/2021 | Comer et al. | |
| 2021/0298868 A1 | 9/2021 | Rydberg | |

OTHER PUBLICATIONS

Szirmay-Kalos et al.; "Displacement Mapping on the GPU—State of the Art;" vol. 25 (2006), No. 3 pp. 1-24, The Eurographics Association and Blackwell Publishing 2008. Published by Blackwell Publishing, 9600 Garsington Road, Oxford OX4 2DQ, UK and 350 Main Street, Malden, MA, 02148 (Year: 2006).*
PCT/US2023/10092 International Search Report and Written Opinion dated Apr. 4, 2023.

* cited by examiner

Primary Examiner — Edward Martello
(74) Attorney, Agent, or Firm — Wood Herron & Evans LLP

(57) ABSTRACT

A system that measures the motion of a camera traveling over a living subject by reference to images taken from the camera, while measuring the subject's shape, pose and motion. The system can segment each image into pixels containing the subject and pixels not containing the subject, and ascribe each pixel containing the subject to a precise location on the subject's body. In one embodiment, a computer connected to a camera and an Inertial Measurement Unit (IMU) provides estimates of the camera's location, attitude and velocity by integrating the motion of the camera with respect to features in the environment and on the surface of the subject, corrected for the motion of the subject. The system corrects accumulated errors in the integration of camera motion by recognizing the subject's body shape in the collected data.

25 Claims, 5 Drawing Sheets

SYSTEM AND METHOD FOR MAPPING THE SKIN

TECHNICAL FIELD

The present invention pertains to mapping systems and methods for evaluation of skin tissue.

BACKGROUND

Detection and management of some diseases benefits from photographic documentation of the skin. A set of baseline images collected at an initial imaging session is compared to the appearance of the skin at a later time to permit detection and measurement of skin evolution. In patients at high risk for development of melanoma, these methods have been shown to permit detection of melanoma at an earlier stage than the standard of care, while requiring excision of fewer benign lesions. Current practice for collection, organization, and use of the images is expensive and logistically complicated, limiting its adoption.

Traditionally, Total Body Photography (TBP) has been performed by a trained photographer, using expensive cameras in a studio set up for the purpose. The photographer positions the subject in a number of reference poses, allowing photographs of as much of the body's skin as possible to be taken. The process of positioning the subject and taking the photographs can require twenty minutes or longer, usually in a separate appointment for the patient. Use of the resulting photographs to recognize changes in the skin is time-consuming and complicated—the dermatologist typically shifts their gaze back and forth from the photograph to the patient's skin, trying to notice change. Cost of TBP is justified only for patients at very high risk for melanoma.

Several companies have developed products to simplify the collection of TBP. One class of these products take the form of a booth outfitted with dozens of high-quality cameras, each focused on a relatively small area of skin. The patient enters the booth, assumes each reference pose, the cameras take photographs, and the data are stored. These systems have been shown to be effective in several studies, but the high capital cost of the system and the space required to house it have limited their adoption. They do not appear to lower the cost of TBP.

Other companies have developed smartphone apps to modernize the traditional TBP workflow. The app helps the photographer guide the patient into reference poses, take photographs, and store and organize the photographs according to the pose and area of the body covered. In this process, there is a tradeoff between the image quality obtained and the number of photographs required to cover the body. Most apps take only 2-4 photographs to cover the body to limit the time required and the complexity of aligning each image. The resulting images are of insufficient quality to evaluate potential cancers of the skin: at the distance they are taken from the subject, the pixel density is too low to resolve important features of cancerous lesions. There has not been a good option to bring the camera closer to the body, because it is hard for the photographer to capture the correct portion of the body consistently from close range, and the careful work to align each of a large number of images would consume a lot of time.

It is an object of invention described here to overcome these tradeoffs, and in particular to provide a method for tracking the pose position of the camera relative to the subject's body despite body motion, so that a large number of closeup images can be captured rapidly, each one of which is mapped to its location on the subject's body.

Existing techniques such as photogrammetry, Visual Odometry (VO) and Visual-Inertial Odometry (VIO) require a static 3D subject and environment. Living subjects are not sufficiently static to generate accurate VO, VIO or photogrammetry results reliably. Accordingly new methods must be developed to accomplish the objectives of the present invention.

U.S. Provisional Patent Application 62/838,662, which was published under the Patent Cooperation Treaty as PCT/WO2020/219665 discloses the general approach of embedding mathematical models of scene motion into the static VIO problem to permit accurate estimation of camera pose in a moving 3D scene. The present application extends that work, specifying mathematical models of scene motion describing moving subjects such as living beings.

SUMMARY OF THE INVENTION

Principles of the present invention provides a system that measures the pose of a camera traveling above the surface relative to a moving subject's body, while also measuring the pose and shape of the body. In one embodiment, a computer connected to a camera, an Inertial Measurement Unit (IMU), a depth sensor, and software provides estimates of the camera's location, attitude and velocity as well as the body's pose. The software operates by integrating the motion of the camera with respect to features on the subject's skin and in the 3D environment, which it corrects for the motion of the subject according to a model of the subject's kinematics and dynamics. In addition to providing an estimate of the camera's pose and the body's pose, this embodiment can map the location of each image pixel repeatably to a coordinate system affixed to and flexing with the surface of the subject's body.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

DETAILED DESCRIPTION

Traditional Visual-Inertial Odometry (VIO), photogrammetry, and related techniques often fail to produce accurate solutions when the field of view contains a live subject. Their mathematical basis includes the assumption that image features are at static 3D locations. This assumption is violated by a living, breathing subject, resulting in significant errors in camera pose estimates and in the estimates of subject 3D shape.

The principles of the present invention elaborated herein overcome this shortcoming. A system built in accordance with principles of the present invention can permit subject motion by leveraging known characteristics of the subject's shape and motion. Whereas traditional photogrammetry solves a series of mathematical optimization problems to find a point cloud representing the subject, and it then fits a mesh to that point cloud, embodiments disclosed herein start with a parameterized mesh capable of matching the range of shapes that the subject may assume. Then, these embodiments solve a series of optimization problems like those solved in VIO and photogrammetry, except that it solves for the time-varying parameters of the mesh directly. This approach leverages knowledge that the body is a solid with known topology, with approximately known size, shape, and motion characteristics. The ability of traditional VIO and photogrammetry to solve for more general shapes often produces nonsensical results when presented with data containing a moving subject, specular reflections, or other common phenomena.

Figure 1:
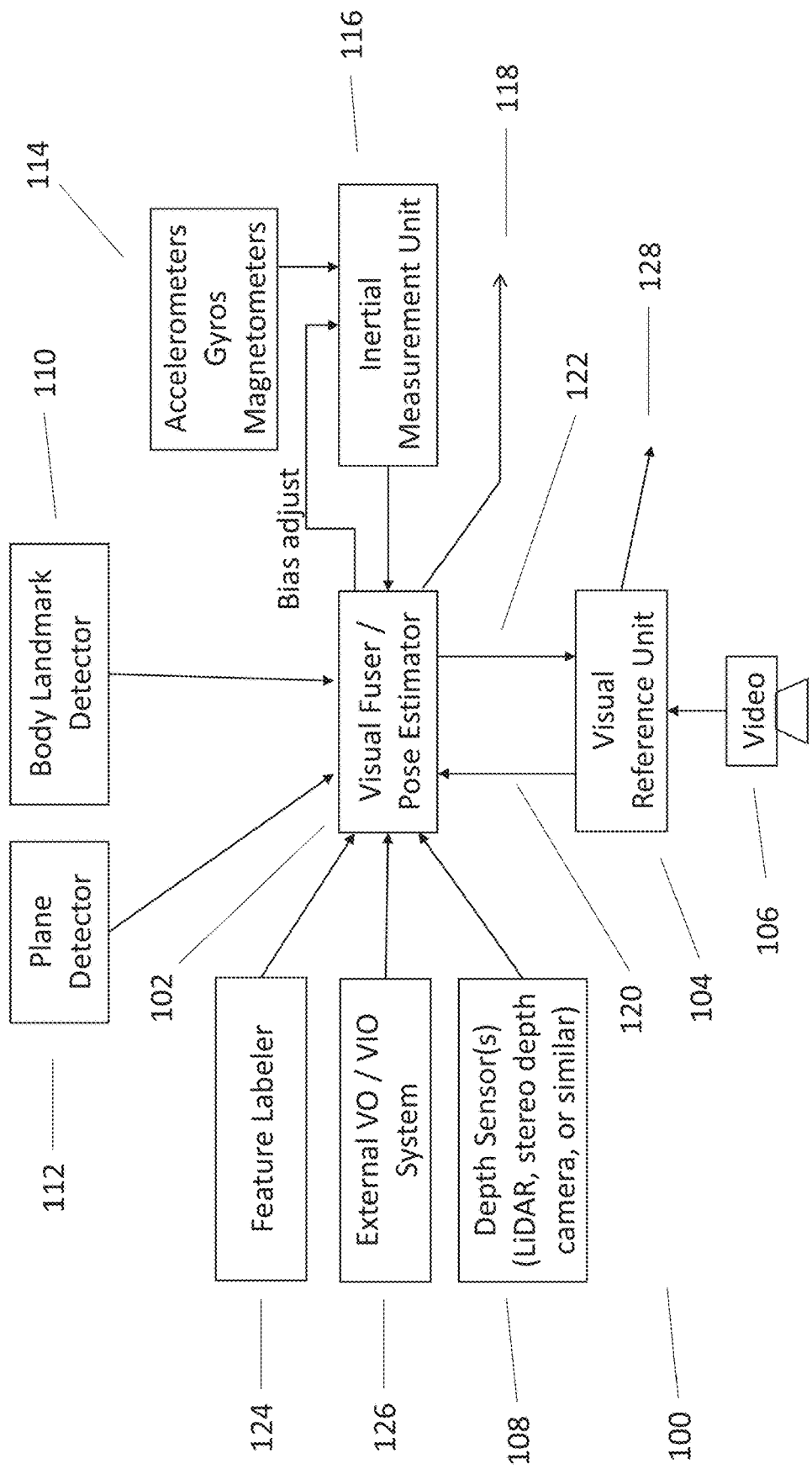
FIG. 1 shows the system diagram of a typical embodiment of the invention.

Referring to FIG. 1, an embodiment 100 of the invention includes one or more processors forming a Visual Fuser/Pose Estimator 102 connected to a camera 106 and optional additional sensors 108, 110, 112, 114, 124, 126. It permits mapping of skin through integration of body kinematic and dynamic characteristics into camera pose estimation calculations. A multitude of complementary input data types are supported and have been demonstrated in a prototype implementation, including: 1) locations of tracked image features in each image frame 120; 2) inertial data produced by an Inertial Measurement Unit (IMU) 116 rigidly attached to the camera 106; and 3) output of a depth sensor 108 such as LiDAR or structured-light depth camera. Any detected bias (nonzero baseline output) from the IMU 116 is identified in the Visual Fuser 102 and corrected via a bias adjustment to the IMU 116. This embodiment of the invention also supports the use of the output of separate software modules, such as motion capture software 110, Visual-Inertial Odometry (VIO) software 126, plane detection software 112, and body segmentation software.

The visual fuser/pose estimator 102 outputs 118 the estimated camera pose and body pose associated with each frame 120, and corresponding data 122 is exchanged with the Visual Reference Unit 104. The Visual Reference Unit 104 outputs 128 the associated frames. These can be stored for further processing offline and later review of the data.

The rest of the following description is organized as follows. First, the means of parameterizing the mesh to assume the shape of living subjects is discussed. Second, various forms of data that may serve as input are covered. Third, formulation of an estimator to calculate the likely pose and shape of the subject, and the pose of the camera over time are explained.

Parameterized Mesh

Figure 2:
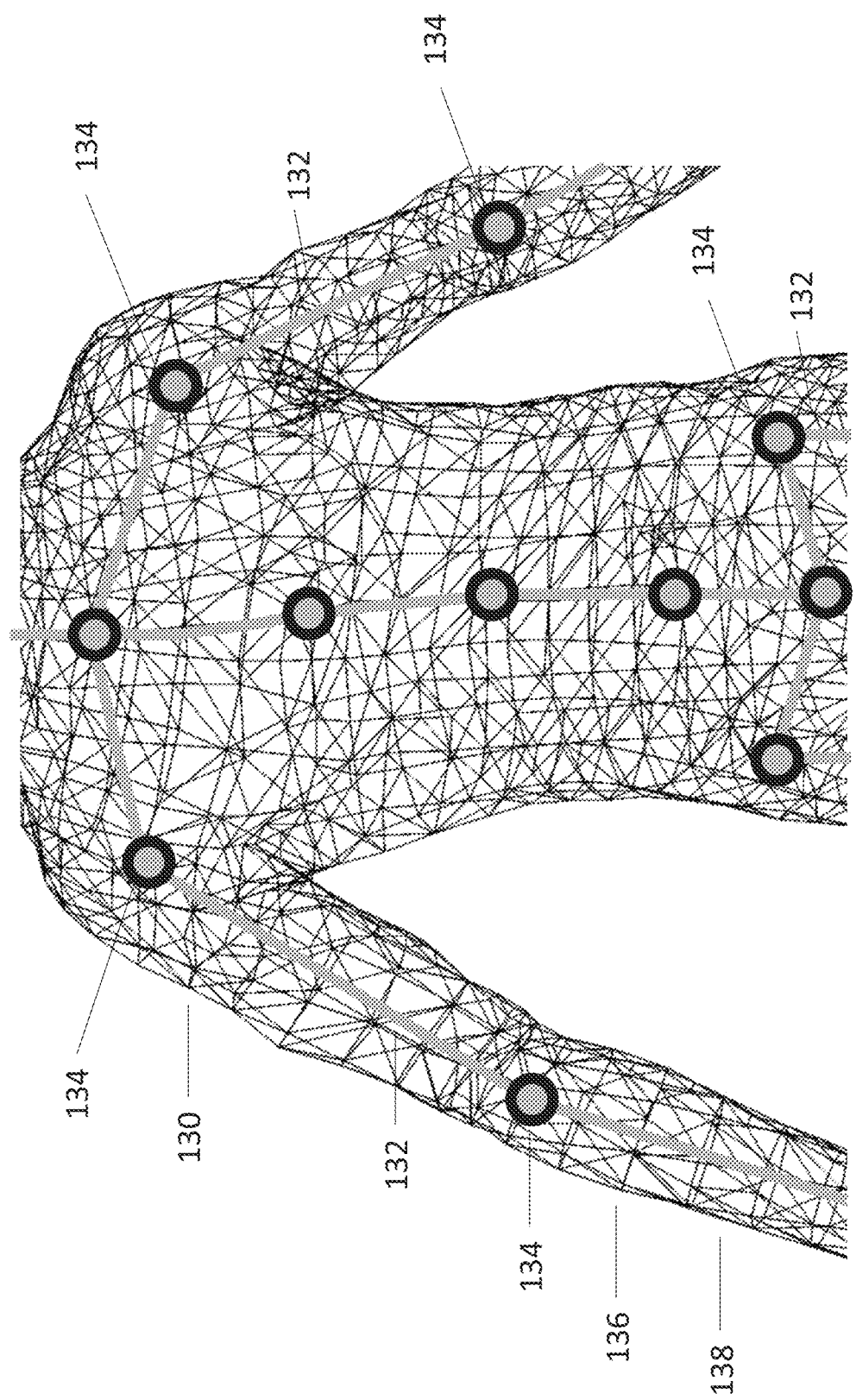
FIG. 2 shows the parameterized body mesh modeling the subject.

Body kinematics are approximated using one or more models of the subject, wherein the locations of the bones of an internal skeleton are modeled. Referring to FIG. 2, each bone b∈B 132 of the skeleton is described by a coordinate transform from world coordinates to bone coordinates, placing the bone into its position in the skeleton. A bone hierarchy also describes the connections of bones as a network of parent bones and child bones connected physically through joints 134. In one embodiment, the center of the pelvis is defined as the root bone, from which the spine extends upwards as one line of children, and the hips and legs descend as other lines of children. Bones in the model need not correspond to physical bones in the subject's body, but they should represent the range of motion of the subject. For instance, an obese person may have an abdominal pannus that can be moved to image underlying skin. Although the pannus and other movable soft tissues lack bones in the anatomical sense, addition of virtual bones in the modeled skeleton permits representation of motion of these soft parts.

A manifold mesh 130 (FIG. 2), consisting of vertices V 136 connected by edges E 138, the surface of which is used to represent the skin of the subject. The position of each vertex of the mesh is calculated using techniques commonly called "skinning" in the computer graphics industry. In one embodiment, Linear Blend Skinning (LBS) is used. In LBS, the vertex j∈V positions are calculated within each bone i∈B's coordinate system in some reference pose: $v_j^i$. A weight matrix with elements $w_{ij}$ such that $\Sigma_{i \in B} w_{ij} = 1$, $\forall j \in V$, captures the dependence of each vertex 136 position to the location and orientation of each bone 132. The location and orientation of each bone i can be captured through a 4×3 bone transformation matrix $T_i$, such that each vertex's position is the weighted sum of its positions transformed from each bone coordinate system to global coordinates, i.e., $v_j = \Sigma_{i \in B} w_{ij} T_i(v_j^i)$, $\forall j \in V$. Thus, as bones 132 are moved, the positions of the $T\_i(v_j^i)$ in world coordinates move, and each mesh vertex 136 moves according to the bones 132 on which it depends with nonzero weight. Other representations for coordinate transformation can be used as well, such as a 3-element translation vector plus a 3-element rotation vector or 4-element quaternion.

A computational advantage to this type of approach is its linearity. In particular, the sensitivity of any vertex's position in world coordinates to any of the elements of $T_i$ can be readily computed and used to find solutions quickly within standard convex optimization solvers. Similarly, the position of any point on the skin specified via barycentric coordinates varies in the same manner.

Variations in shape can also be captured through two additional techniques: additional hand-designed parameters and linear interpolation among a set of resting vertex positions.

An example hand-designed parameter is the bone-specific girth scaler. This parameter multiplies each vertex's x and y position in bone coordinates (adopting without loss of generality the convention that the z dimension is along the length of the bone), expanding or reducing the girth of the body part associated with the bone. Similarly, a bone-specific length scaler that multiplies each vertex's z position in bone coordinates lengthens or shortens each bone and associated body parts.

Even in cases where such hand-designed parameters capture the body variations of interest, it can be appropriate to use a second technique: linear interpolation among a set of vertex resting positions. In this technique, a second weighting matrix with elements $x_{ik}$ is used to express the similarity of each part of the body being scanned to the corresponding part of each of the reference bodies in a library. In equation form, $v_j = \Sigma_{i \in B} \Sigma_{k \in M} x_{ik} w_{ij} T_i(v_j^{ik})$, $\forall j \in V$. This approach can be useful to capture the different ways that bodies are shaped, representing each person's shape as a combination of other peoples' shape within a library of shapes.

Input Data—Tracked Features

VO and VIO software packages use a variety of approaches to find and to track visual features of interest from image frame to image frame. For instance, OpenCV has several built-in algorithms, such as goodFeaturesToTrack, to find points with strong contrasts in two directions, and calcOpticalFlowPyrLK, to track those points from frame to frame. Others have used neural network approaches. Regardless of the exact source, the x-y image coordinates of these features in each frame are one optional input to the invention. If this input is not provided or calculated within the invention, the output of a standard VIO package can be used instead.

Input Data—Inertial

Data from an Inertial Measurement Unit (IMU) rigidly attached to the camera is an optional input that allows improved performance. Provision of tracked features together with inertial data permits deep integration of the two types of data, as is commonly performed in VIO software, along with other considerations contained in other inputs. Without these, the output of a VO/VIO package can be used by the invention, a configuration which permits correction of the VO/VIO errors based on consistency with the subject model and other data.

Input Data—VO/VIO Estimates

Several VIO packages are widely available. Indeed, some are now built into the software available in standard installations on Android and iOS-based mobile devices and carefully designed for efficiency on that hardware. For ease of implementation, embodiments of the present invention can make use of the output of such packages. Specifically, the 6-degree of freedom camera pose at the time of each image can be used as an input, which corrects the VO/VIO pose estimate based on the other data. Additionally, some VO/VIO software provides 3D positions of tracked features, which can be input just as the data from depth sensors are.

Input Data—Depth Sensors

A variety of depth sensors have been integrated into commodity mobile devices, and their data can help produce more accurate and robust results. Data from depth sensors can be converted into 3D points in the sensor's coordinate system. The world coordinate positions of these 3D points can be calculated using the transform expressing the sensor coordinate system in world coordinates. Thus, comparison of the 3D data from the depth sensors with the modeled 3D shape of the subject and environment provides embodiments of the present invention with information concerning the sensor coordinate system as well as information concerning the 3D shape of the modeled subject and environment.

Input Data—Labeled Features

As the system collects image data, it may run a variety of feature labeling algorithms to uniquely identify features in the environment and on the body. Examples of such algorithms are the Scale-Invariant Feature Transform (SIFT), Speeded-Up Robust Features (SURF), and specialized skin lesion identification algorithms. The output of these algorithms—the image coordinates and labels of features—are an optional input to some embodiments of the invention, used to reduce errors that might otherwise accumulate in the system's estimates.

Input Data—Detected Planes

Many augmented reality software systems present on mobile devices can detect and localize planar surfaces within the environment. Embodiments of the present invention can use this type of information in several ways. First, the presence of a floor plane provides a lower limit to the positioning of the subject. If the subject is standing on the floor, the difference between the top of the subject and the floor plane provides the subject height, which is useful especially for initial scaling. If the subject is positioned on the floor with space around him/her/it, segmentation of the subject from other parts of the environment is simplified, because data concerning the floor can be quickly identified as such by its 3D location. Once identified, floor data and other data not connected to the subject are readily segmented geometrically from the subject. The locations of detected planes are thus provided to the invention when available.

Input Data—Detected Body Landmarks

A variety of software systems is available to detect and localize humans and other subjects in an image frame. Neural networks can recognize bodies and body landmarks, and systems provided in common mobile operating systems also provide the locations of inferred landmarks that are obscured or outside the field of view. Embodiments of the present invention makes use of these data, when available, to align the modeled subject with the real subject. They may be provided as 3D locations of key body landmarks such as skeletal joints, facial features, and the like within a VIO reference frame, or they may be provided as 2D locations within each image frame.

Input Data—Previously Labeled Features

If the subject has been scanned previously, and the locations of previously labeled features have been mapped to the subject's body, then the labels created during a new scan of the subject can be compared to the previously mapped labeled features. High confidence matches between previously labeled features and new features are then treated the same as detected body landmarks.

Pose Estimation

Using input data such as that described above, one embodiment of the present invention estimates the camera pose and the shape and pose of the body, that is, the six variables for camera orientation and position, the variables making up the bone coordinate transforms and other parameters of the modeled skeleton, and optionally the weightings $x_{ik}$. In one embodiment, this estimation is performed by finding the solution to a nonlinear optimization problem wherein the objective function is a weighted sum of terms, each term expressing the error between an aspect of the modeled body and the observations contained in the input data. If M aspects of such error are included, the objective function can be expressed as:

$$\min_q \Sigma_{m \in 1 \ldots M} \rho_m(\|f_m(q_{m1}, \ldots, q_{mk})\|^2)$$

Here, the decision variables q represent the parameters being optimized, i.e., the camera pose parameters, body pose parameters, any weight parameters, etc. The function $f_m(\cdot)$ is a cost function for aspect m of error, and $\rho_m(\cdot)$ is a loss function as is commonly used to improve robustness to outliers in nonlinear optimization. An important aspect of the invention is in the cost functions $f_m(\cdot)$ used for each type of error. These aspects are as follows.

Figure 3:
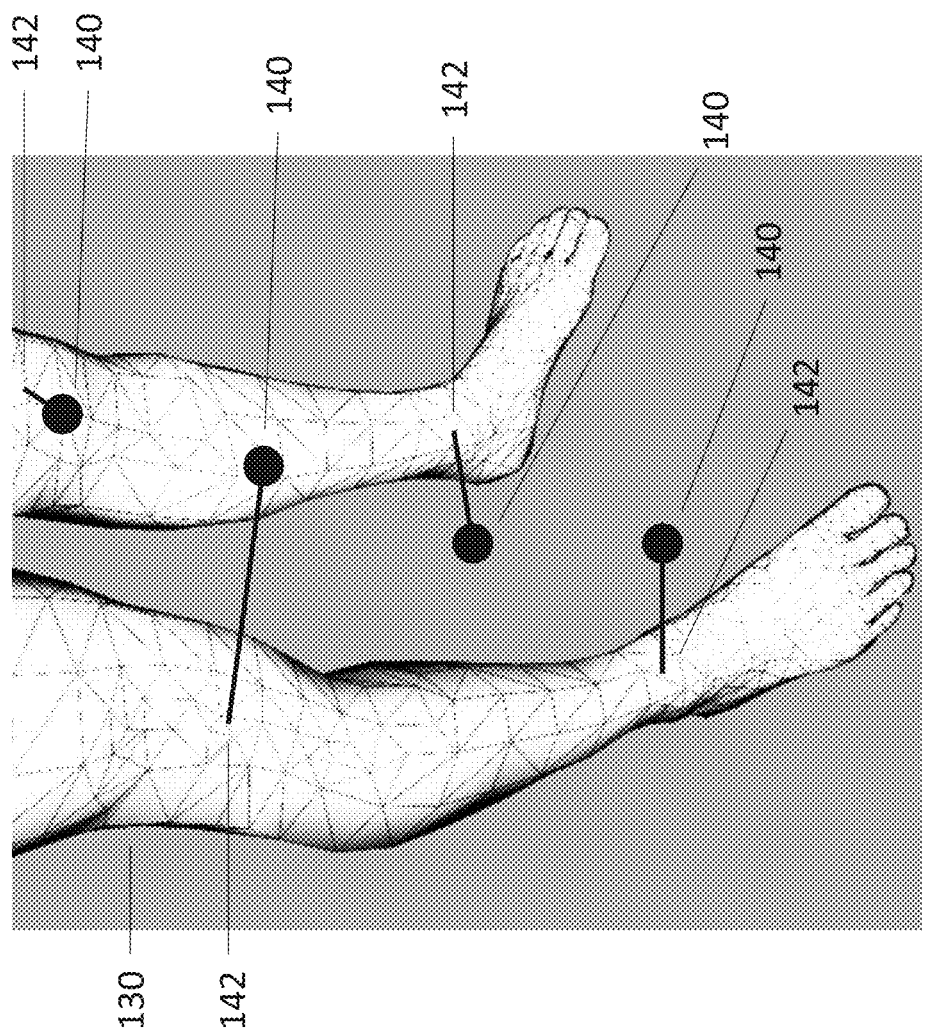
FIG. 3 shows the matching of detected body landmarks to the appropriate places in the body mesh model via the body landmark objective function component.

Body landmark positions: FIG. 3 depicts the use of body landmark positions in embodiments of the present invention. In advance, the landmarks 142 on the mesh 130 (see also FIG. 2) corresponding to the landmarks detected in the input data 140 are mapped in the model and represented via the same weighted skinning scheme (e.g., linear blend skinning) as used to represent the skin vertices. In this way, the 3D position of each landmark 142 on the subject modeled by mesh 130 is represented as a function of the optimization decision variables. If the sensed body landmarks 140 are provided in 2D coordinates, the cost function measures the 2D distance from the sensed landmarks to the projection of the modeled landmarks onto the image plane, where the projection is according to the camera pose decision variables.

If the sensed body landmarks are provided in 3D coordinates, the cost function can either (1) measure the 2D distance from the projection of the sensed landmarks onto the image plane to the projection of the modeled landmarks on the image plane, where the projection of the former is made according to the camera projection estimate used by the landmark detector, and the projection of the latter is made according to the camera pose decision variables, or (2) measure the 3D distance from the sensed landmarks offset by parameters representing a VIO drift estimate to the modeled landmarks. The option that works best depends on the method used internally by the body landmark sensor to geolocate the body landmarks.

Figure 4:
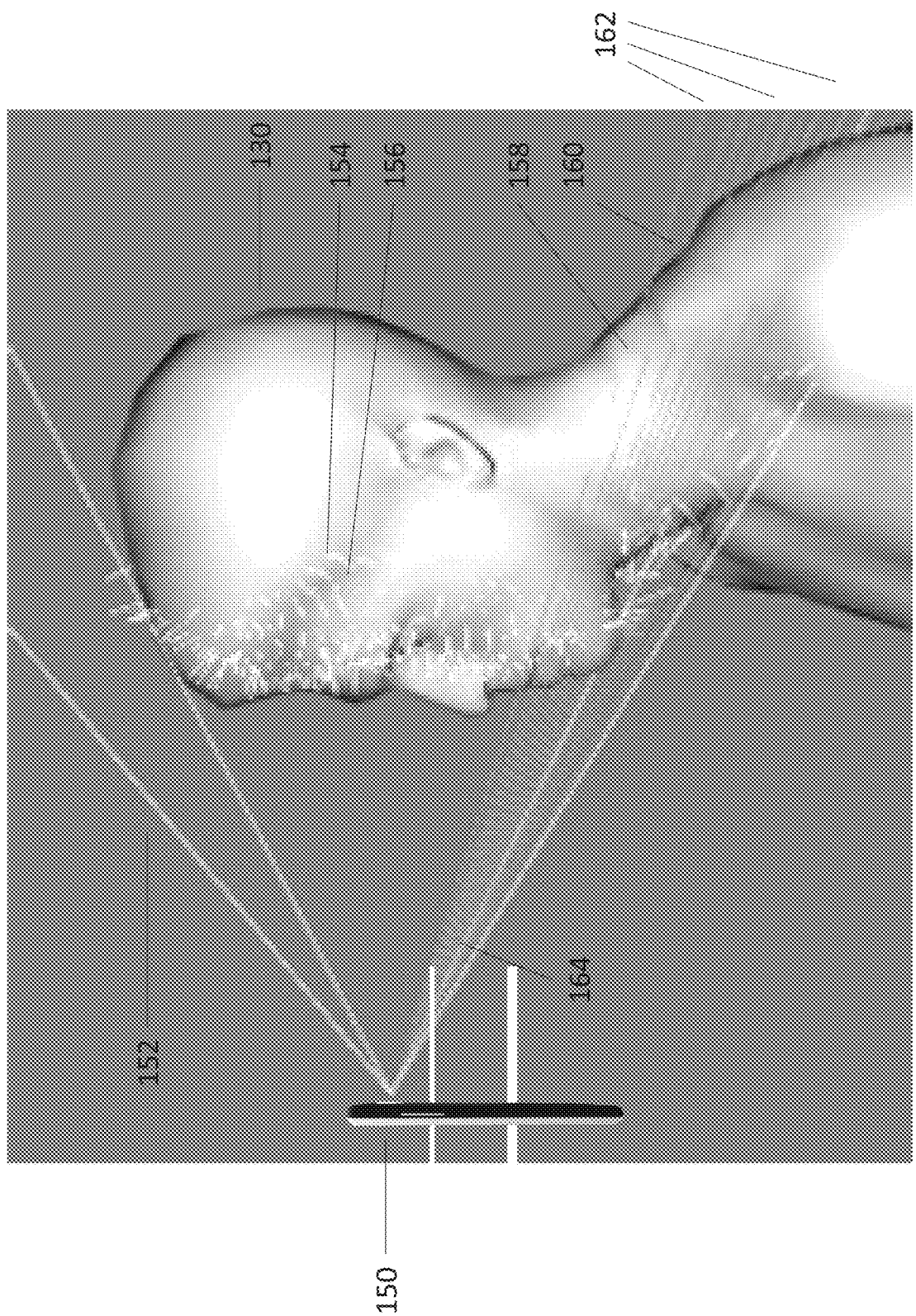
FIG. 4 depicts the objective function components associated with 3D depth sensors.

Depth sensor data: Embodiments of the present invention can use available depth sensor data, as depicted in FIG. 4. Use of this data first segments the depth sensor data into on-body points, off-body points, and undetermined points. This process relies on identification of the floor or other surface on which the subject is supported, using built-in horizontal plane detection algorithms or input from a horizontal plane detector 112. When the system has already tracked the body with some degree of accuracy, it performs the segmentation by taking the points closest to the previously tracked body and placing them into the on-body point set. It then adds any neighbors of the on-body points to the on-body points set, repeating this process until it has no more neighbors to add. Neighbors to a point p in this process are defined as points within a distance d of point p, which are not close enough to the floor or other elements of the environment to potentially be part of the off-body or undetermined point sets. The distance d can be chosen according to the characteristics of the sensor: it should be larger than the spacing between points in the sensor array unprojected onto the subject (potentially significantly larger if the depth sensor at times fails to detect points where they land on the body), and smaller than the distance between the subject and surrounding non-body objects. Points that comfortably exceed distance d from the body when this process is complete are placed into the off-body point set.

If the body has not yet been tracked reliably, another method is used to initialize the above process. Use of a body landmark detector, interaction with the user of the device, and detection of a grouping of points in the point cloud supported from the floor and of the right proportions to be the subject are all methods that can be used in different circumstances.

Once the segmentation is complete, in some embodiments of the invention, two types of error from the data may be measured, creating two cost functions. The first type of cost function penalizes solutions based on the distance of the modeled skin 154 from the on-body point observations 156. The second type of cost function penalizes solutions based on the degree to which the subject's body modeled by mesh 130 (FIGS. 2, 3) intersects rays 164 in the field of view 152 from the sensor through non-body points 162 that are farther from the sensor than the body.

Figure 5:
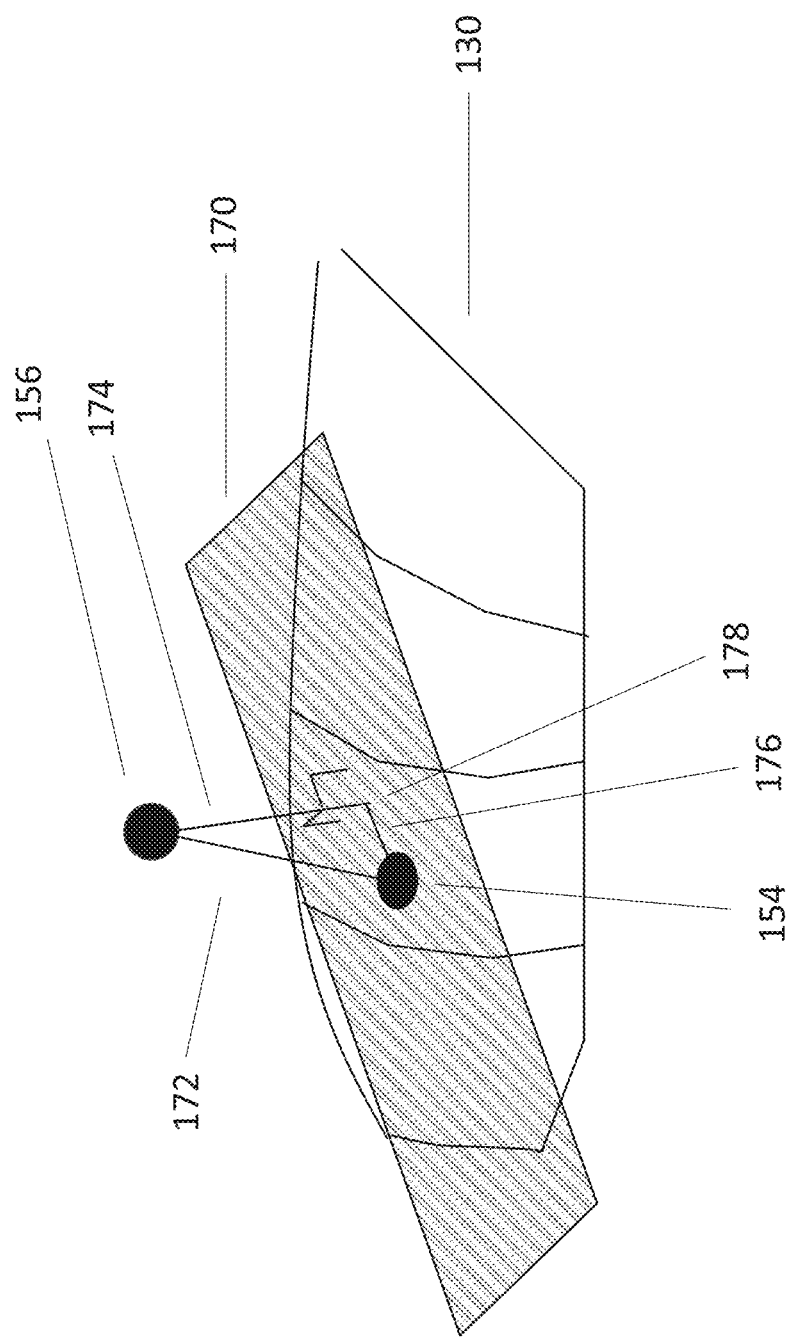
FIG. 5 shows the linear approximation of the 3D depth functions.

In the first cost function type, the nearest point on the modeled skin mesh to each sensed 3D point is first found via a method such as an axis-aligned bounding box (AABB) tree. To remove the possibility of matching surfaces obscured from the point of view of the depth sensor, the AABB tree is constructed using only faces of the mesh with surface normals pointing toward the sensor. Referring to FIG. 5, the natural cost function to use would then be the 3D distance 172 from the nearest point 154 on the skin surface modeled on mesh 130 (see also FIGS. 2, 3) to the associated sensed 3D point 156. However, because the AABB tree operation is computationally expensive and complicated to embed in nonlinear optimization solvers, it is advantageous to substitute the point on the skin at which the nearest point 154 was initially calculated, before any solver iterations moved the skin by changing the bone transform decision variables. The nearest point 154 is thus represented using the same weighted skinning scheme (e.g., linear blend skinning) as used to represent the skin vertices. In linear blend skinning, the row of the weight matrix corresponding to this point can be found by averaging the rows of the weight matrix corresponding to the vertices defining the face in which the nearest point lies, weighted according to the barycentric coordinates of the nearest point.

As solver iterations update the bone transform decision variables, the point on the skin 154 that was originally nearest to the sensed point 156 moves with the skin. A recalculation of the nearest point on the skin via the AABB tree would generally produce a different point 178, such that the sensed point 156 lies along the normal 174 to the skin from the point 178. Use of the natural cost function minimizing 3D distance 172 would inhibit tangential movement of the skin and efficient solution of the optimization.

A solution to this problem is through use of a cost function that measures only the skin-normal component 172 of the distance from the nearest point 154 to the sensed point 156. This cost function approximates the skin's surface as a plane tangential to the originally calculated nearest point 154, for purposes of calculating the distance of the sensed point 156 from the skin. This local linearization allows the Jacobian of the cost function to be calculated, permitting rapid iteration by the solver, and it imposes no restrictions on tangential movement of the skin. This choice of cost function drives the optimization toward solutions where a linear approximation 170 to the surface of the skin in the general vicinity of the nearest point 154 is moved toward the observed point 156.

Referring back to FIG. 4, the second type of cost function penalizes solutions based on the degree to which the subject's body modeled by mesh 130 intersects rays 164 from the sensor through non-body points 162. For this cost function, an AABB tree can be used to find intersections between the subject's body modeled by mesh 130 and the rays from the 3D sensor 164 through the observed non-body points 162. Any such intersections indicate a part of the subject's body modeled by mesh 130 is in a space where the physical subject is not, or that the modeled 3D sensor 150 is in a place where the physical sensor is not, or both. In the preferred embodiment, all intersections of the rays with the modeled body are found. These intersections are in pairs: one intersection where the ray enters the body 158 and another intersection where it leaves the body 160. The midpoints between the entering and leaving intersections are found by linear interpolation and are, by construction, internal to the modeled body. The nearest point on the mesh to each of these midpoints in a direction normal to the intersecting ray are then found. The distance from the nearest points to the midpoints constitute the cost function to be minimized, driving adjustments to the body to move it out of the way of the rays 164.

VO/VIO Drift

If estimates from a separate VO/VIO system 126 are provided as input in particular embodiments of the invention, those estimates will drift as the subject moves. The manner of drift depends heavily on the VO/VIO system used, the accuracy of inertial information, the degree to which the VO/VIO system relies on static versus moving features in any given situation, and a variety of related issues. Inclusion of two elements of VIO drift in the cost function help drive solutions to include the information available in the VIO estimates without being driven away from the correct solution by the VIO drift errors.

The two elements of VIO drift that may be used in embodiments of the present invention are (1) incremental VIO drift relative to the previous VIO drift estimate, and (2) total VIO drift. For VIO systems with sufficiently accurate angular inertial systems, it may be sufficient to use only a 3-Degree-of-Freedom (DOF) translational drift component as the cost function. Other systems may require a 6-DOF drift estimate. The different dimensions of drift should generally be weighted differently. Certainly, angular drift and translational drift exhibit very different characteristics and should have very different weights. Similarly, pitch and roll drift are typically removed from the estimates by the VIO algorithm using the measurement of gravity, whereas heading usually lacks as reliable a reference and grows over the course of navigation if not corrected.

The VIO drift decision variables related to a frame can be added to the 3D translation component of the VIO camera pose estimate for the frame (in the event of 3-DOF drift), or to the 6D translation+rotation vector representation of VIO camera pose for the frame in the event of 6-DOF drift.

Internal VO/VIO Cost Function

If VO/VIO is performed internally in an embodiment of the invention, the traditional elements of VO/VIO system cost functions may be used, such as reprojection error and integrated inertial discrepancies, and they may be added to the optimization objective function. Use of the keyframe approach greatly improves computational performance.

Subject Motion Cost Functions

If the subject is instrumented with sensors, the discrepancy between sensed positions, accelerations, etc. and the modeled body pose is a useful cost function.

With or without instrumentation, a subject that attempts to hold a pose justifies two cost functions: (1) the difference between the target pose and the modeled body pose, and (2) the rate of movement of the body pose. Small differences and small amounts of movement are inevitable, thus the weights on these objective coefficients should be set appropriately.

Skeletal Integrity Cost Function

The location of a child bone in the parent bone coordinate frame should generally not move. The joint that connects a parent bone to a child bone is rigidly attached to the parent bone, when both bones are part of an anatomical skeleton. Inclusion of the difference in 3D position between the joint's parent-bone coordinates initially and its coordinates through the course of solution can prevent unrealistic separation of skeletal components.

Use of Optimization Result

To allow rapid solutions in real time, the optimization problem for each frame can be formulated as a stand-alone problem with initial conditions set by the solution to the previous frame's problem. Alternatively, a keyframe-type approach can be used in which a number of recent frames and prior keyframes are solved all together, with initial conditions fixed according to the solution determined before the beginning of the problem time horizon.

After a scan is completed, the solutions may be re-optimized in post-processing over the entire set of frames simultaneously.

As a result of either real-time or post-processed use, the solutions to the modeled body position and to the camera pose provide an initial indication of which pixels of each image belong to which parts of the modeled skin. This initial indication may be used in several ways. It may be used to shade the body model according to the pixel density captured of the skin, or according to the sharpness or other measures of image quality captured of the skin, or according to a combination thereof. It may also be used to texture the skin of the model according to the best images achieved of each area of skin. Furthermore, it may be used as an initial solution to further refinement of the body model using local displacement textures and/or dense model reconstruction with a larger number of features, where mis-correspondences are minimized through a requirement to adhere to the initial solution.

What is claimed is:

1. A system for capturing and bio-registering imagery of a living subject, comprising:
   a. a camera,
   b. a processing unit configured to receive images of a surface of skin of the subject from the camera, the processing unit controlling the camera to develop images including a plurality of images at close range to the subject, each image capturing less than the subject's whole body in its field of view, the processing unit further causing images to be taken at different times, wherein movement occurs between those different times causing deformation of the skin of the subject,
   c. a memory containing a parameterized mathematical model characterizing the subject and its dynamics and kinematics of motion, the memory including a representation of a reference body coordinate system affixed to the subject's body and flexing with the surface of the body as the subject moves, and
      i. a program on the processing unit to calculate estimates of parameters of the mathematical model characterizing the subject and its motion and the camera's pose and motion,
   wherein the processor:
      determines a location within the reference body coordinate system of pixels in each collected image that capture the skin of the subject, and
      minimizes a distance between the coordinates of the pixels from more than one image pertaining to a common skin feature, as measured in the reference body coordinate system or in a projection thereof to each image, such that subject motion between the points in time at which the images were taken is consistent with the mathematical model's characterization of subject motion.

2. The system of claim 1 further comprising a depth sensor aligned with at least part of the camera view.

3. The system of claim 2 wherein the depth sensor is a LiDAR depth sensor.

4. The system of claim 1 further comprising an Inertial Measurement Unit (IMU) rigidly attached to the camera.

5. The system of claim 1 further comprising a compass or magnetometer rigidly attached to the camera.

6. The system of claim 1 further comprising wherein the program on the processing unit performs a feature detector algorithm that finds and/or tracks features within the 3D scene, providing their 2D image locations across at least 2 images.

7. The system of claim 1 wherein the program on the processing unit performs a neural network based artificial intelligence algorithm to detect the locations of body landmarks comprising one or more of joints and facial features.

8. The system of claim 1 wherein the program on the processing unit performs a Visual-Inertial Odometry (VIO) algorithm that will estimate position and orientation of the camera from the tracking of features in a static scene.

9. The system of claim 1 wherein the parameterized mathematical model of the subject includes the location and orientation of skeletal structure from which the location of vertices of a mesh representing the skin of the subject are calculated through linear blend skinning.

10. The system of claim 9 wherein the parameterized mathematical model of the subject includes additional parameters representing adjustments to the height, weight, or girth measurements of the subject.

11. The system of claim 10 wherein the mesh vertex offsets used in linear blend skinning are determined by a set of parameters linearly weighting the mesh vertex offsets from a library of body meshes representing different subject shapes.

12. The system of claim 11 wherein the processing unit calculates the camera and subject states by solving an optimization problem minimizing discrepancy between the sensed data and the data predicted to be sensed as a result of application of the subject and camera motion models to the states.

13. The system of claim 12 wherein one factor of the cost function is a mathematical function of the displacement normal to the mesh surface of 3D points sensed by a depth sensor aligned with at least part of the camera view.

14. The system of claim 12 wherein one factor of the cost function is the displacement normal to the mesh surface of 3D points estimated by a Visual-Inertial Odometry (VIO) algorithm that will estimate position and orientation of the camera from the tracking of features in a static scene.

15. The system of claim 12 wherein one factor of the cost function is the surface normal component of reprojection error.

16. The system of claim 12 wherein one factor of the cost function is the distance by which the subject model occludes 3D observations of an environment behind the subject produced by a depth sensor aligned with at least part of the camera view.

17. The system of claim 12 wherein one factor of the cost function is the 3D displacement of sensed body landmarks away from their normal positions on the mesh.

18. The system of claim 17 wherein the normal positions of body landmarks are determined by the locations of landmarks corresponding photographically to the present landmarks in a previously completed scan of the body.

19. The system of claim 17 wherein the normal positions of body landmarks are determined by the locations of landmarks corresponding photographically to the present landmarks, captured earlier in the present scan of the body.

20. The system of claim 17 wherein the normal positions of body landmarks are determined by the locations on the parameterized mathematical model of the subject of skeletal joints or facial features.

21. The system of claim 12 wherein one factor of the cost function is the amount of incremental and/or total drift contained in the estimates produced by a Visual-Inertial Odometry (VIO) algorithm that will estimate position and orientation of the camera from the tracking of features in a static scene.

22. The system of claim 12 wherein one factor of the cost function is the average rate of motion of the subject's skeletal joints.

23. The system of claim 12 wherein one factor of the cost function is the difference between the subject's bone positions and a desired reference pose.

24. The subject of claim 12 wherein one factor of the cost function is the difference in the location of a joint between a parent and child bone, expressed in the parent bone's coordinate system, from its location in the initial reference skeleton.

25. The system of claim 12 wherein the objective function weights are adjusted according to the degree of uncertainty in the measurements.

* * * * *

UNITED STATES PATENT AND TRADEMARK OFFICE
CERTIFICATE OF CORRECTION

| | |
|---|---|
| PATENT NO. | : 11,922,576 B2 |
| APPLICATION NO. | : 17/568431 |
| DATED | : March 5, 2024 |
| INVENTOR(S) | : William D. Hall |

It is certified that error appears in the above-identified patent and that said Letters Patent is hereby corrected as shown below:

In the Specification

Column 1, Line 32, delete: "One class of these products take the ...",
Insert: --One class of these products takes the ...--.

Column 2, Line 19, delete: "Principles of the present invention provides a system ...",
Insert: --Principles of the present invention provide a system ...--.

Column 8, Line 52, delete: "... intersecting ray are then found.",
Insert: --... intersection ray is then found.--.

In the Claims

Column 10, Line 28, Claim 1, Line 19, delete: "i. a program on ...",
Insert: --a program on ...--.

Column 12, Line 28, Claim 24, Line 1, delete: "The subject of claim 12 wherein ...",
Insert: --The system of claim 12 wherein ...--.

Signed and Sealed this
Tenth Day of December, 2024

*Katherine Kelly Vidal*
*Director of the United States Patent and Trademark Office*